(12) United States Patent
Cassidy et al.

(10) Patent No.: US 9,650,932 B2
(45) Date of Patent: May 16, 2017

(54) INSULATED REDUCTANT TANK (71) Applicant: Caterpillar Inc., Peoria, IL (US)

(72) Inventors: Theron Cassidy, Peoria, IL (US); Umakanth Sakaray, Peoria, IL (US); Brian Cole, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 38 days.

(21) Appl. No.: 14/578,882

(22) Filed: Dec. 22, 2014

(65) Prior Publication Data

US 2016/0177799 A1 Jun. 23, 2016

(51) Int. Cl.
| | |
|---|---|
| *F01N 3/00* | (2006.01) |
| *F01N 3/10* | (2006.01) |
| *F01N 3/20* | (2006.01) |
| *F01N 13/14* | (2010.01) |
| *F01N 13/00* | (2010.01) |

(52) U.S. Cl.
CPC ......... *F01N 3/2066* (2013.01); *F01N 13/148* (2013.01); *F01N 13/009* (2014.06); *F01N 13/0097* (2014.06); *F01N 2240/20* (2013.01); *F01N 2570/18* (2013.01); *F01N 2610/1406* (2013.01); *Y02T 10/24* (2013.01)

(58) Field of Classification Search
CPC .... F01N 3/2066; F01N 13/02; F01N 2610/02; F01N 3/0842; F01N 13/009; F01N 13/0097; F01N 13/148; F01N 2240/20; F01N 2570/18; F01N 2610/1406; Y02T 10/24
USPC .................... 60/286, 295, 301, 303
See application file for complete search history.

(56) References Cited

U.S. PATENT DOCUMENTS

| | | | |
|---|---|---|---|
| 7,017,336 B2 | 3/2006 | Stiermann | |
| 7,647,767 B2* | 1/2010 | Osaku | F01N 3/2066 60/286 |
| 8,429,900 B2* | 4/2013 | Knetsch | B01D 53/90 60/286 |
| 2011/0079683 A1* | 4/2011 | Stolte | B64D 37/32 244/129.2 |
| 2012/0152967 A1 | 6/2012 | Smurzynski | |
| 2013/0074479 A1 | 3/2013 | Ryoo et al. | |
| 2013/0186349 A1 | 7/2013 | Wright et al. | |

FOREIGN PATENT DOCUMENTS

| | | | |
|---|---|---|---|
| DE | 102008010105 | * | 8/2009 |
| DE | 102009028346 | * | 2/2011 |
| JP | 05054625 B2 | | 8/2012 |

* cited by examiner

*Primary Examiner* — Thai Ba Trieu
*Assistant Examiner* — Diem Tran
(74) *Attorney, Agent, or Firm* — Baker & Hostetler LLP (57) ABSTRACT

An insulated reductant tank that is arranged so that it has an insulated upper portion and a tapered lower portion, the reductant tank configured to allow frozen reductant to move into the insulated upper portion and reduce the damage that frozen reductant can cause to a reductant tank when the frozen reductant expands. The insulated reductant tank can include at least one header configured to draw reductant from the reductant tank and supply the reductant to an exhaust aftertreatment system, an insulation layer lining an upper portion of the reductant tank, a tapered lower portion, and at least one baffle configured to control a flow of reductant.

17 Claims, 6 Drawing Sheets

FIG. 4 ically provides an expansion volume in the upper portion of the reductant tank.

INSULATED REDUCTANT TANK

TECHNICAL FIELD

This disclosure relates generally to a reductant tank configuration for use with a selective catalytic reduction (SCR) system provided on a machine configured for cold-weather operations. More particularly, the disclosure relates to an insulated reductant tank configuration for use with a SCR system provided on a machine configured for cold-weather operations.

BACKGROUND

One known method for abating certain diesel engine exhaust constituents is by use of an exhaust aftertreatment system that utilizes Selective Catalytic Reduction (SCR) of pollutants such as nitrogen oxides. In a typical SCR system, urea, a urea-based water solution or similar reductant solution is typically mixed with exhaust gas. In some applications, the reductant solution is injected directly into an exhaust passage through an injector device. The injected reductant solution typically mixes with exhaust gas to provide, for example, ammonia ($NH_3$) in the exhaust stream. The ammonia then reacts with nitrogen oxides ($NO_x$) in the exhaust in conjunction with a catalyst to provide nitrogen gas ($N_2$) and water ($H_2O$).

As can be appreciated, SCR systems require the presence of some form of reductant close to the engine system such that the engine can be continuously supplied during operation. Various reductant delivery systems are known and used in engine applications. In known reductant injection systems, temperature-related challenges may arise that can affect the storage of reductant.

One type of reductant is diesel exhaust fluid, which can be stored in an on-board vehicle tank, which is often made of steel. When a steel tank holding a reductant such as diesel exhaust fluid is subjected to temperatures below freezing, the reductant stored in the tank can freeze. Subsequently, the reductant can become trapped in the tank. When the trapped reductant freezes, the frozen reductant can expand, subsequently causing reductant in the tank to exert a force against the reductant tank. This expansion of the reductant may result in the tank bulging and becoming deformed, damaged, or cracked. The expansion can damage tank welds, or the like, often further damaging internal tank components.

U.S. Pat. No. 8,429,900, entitled "Liquid container for motor vehicles," discloses a liquid container for motor vehicles, the container having an interior free space corresponding to an increase in a volume of liquid that has frozen. However, U.S. Pat. No. 8,429,900 does not address controlling reductant freezing to prevent damage to the tank.

Accordingly, what is needed is an approach to control reductant freezing in the tank in which the reductant is stored in order to prevent or limit damage to the tank.

SUMMARY

In one aspect of the invention, an insulated reductant tank is disclosed comprising a plurality of sides connected to form a tank having an upper portion and a lower portion, a component configured to draw reductant from the tank and supply the reductant to an exhaust aftertreatment system, and at least one insulation layer arranged along at least one side of the upper portion of the plurality of sides of the tank, wherein the upper portion and the lower portion are configured with the at least one insulation layer to control freezing of the reductant within the tank, and wherein the at least one insulation layer insulates the upper portion more than the lower portion.

In another aspect of the invention, an insulated reductant system is disclosed comprising a machine configured to operate on diesel fuel, a diesel fuel engine on the machine, an exhaust aftertreatment system on the machine, and a reductant tank on the machine, the reductant tank having a reductant, at least one insulation layer lining at least an upper portion of the reductant tank, a lower portion, and at least one component, wherein the at least one component is configured to draw the reductant from the reductant tank and supply the reductant to the exhaust aftertreatment system.

In another aspect of the invention, a method for controlling a freezing of reductant in a reductant tank is disclosed comprising arranging a plurality of sides having an upper portion and a lower portion to provide the reductant tank, wherein the lower portion of the plurality of sides is tapered, insulating at least the upper portion of the plurality of sides of the reductant tank, wherein insulating at least the upper portion comprises insulating the upper portion more than the lower portion, and providing an expansion volume in the reductant tank in the upper portion.

DETAILED DESCRIPTION

Figure 1:
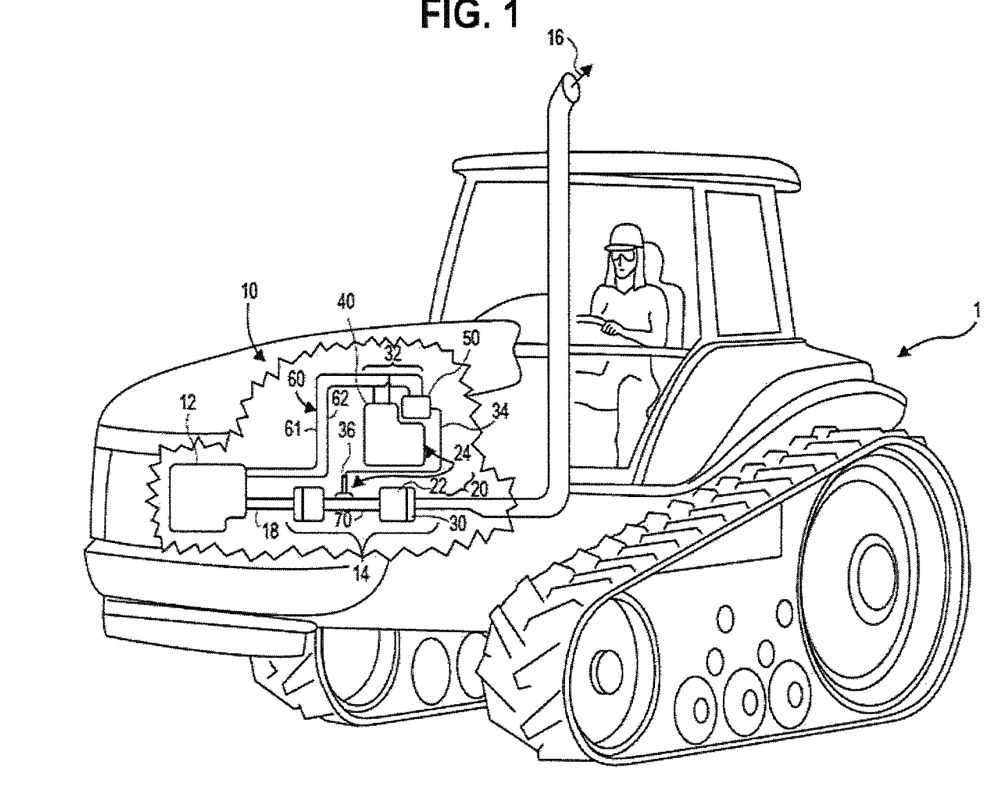
FIG. 1 is an exemplary view of a machine with an engine and an exhaust aftertreatment system generating an exhaust stream according to an aspect of the disclosure.

FIG. 1 is an exemplary view of a machine with an engine and an exhaust aftertreatment system generating an exhaust stream according to an aspect of the disclosure. In particular, FIG. 1 shows a machine 1 including a power system 10. The machine 1 may be a tractor (as illustrated), mining truck, on-highway truck, car, vehicle, off-highway truck, earth moving equipment, material handler, logging machine, compactor, construction equipment, stationary power generator, pump, aerospace application, locomotive application, marine application, mining machine, or any other device or application requiring a power system 10.

The power system 10 includes an engine 12 and an exhaust aftertreatment system 14 to treat an exhaust stream 16 produced by the engine 12. The engine 12 may include other features not shown, such as controllers, fuel systems, air systems, cooling systems, peripheries, drive-train components, turbochargers, exhaust gas recirculation systems, and the like. The engine 12 may be any type of engine (internal combustion, gas, diesel, gaseous fuel, natural gas, propane, etc.), may be of any size, with any number of cylinders, any type of combustion chamber (cylindrical, rotary spark ignition, compression ignition, 4-stroke and 2-stroke, etc.), and in any configuration ("V," in-line, radial, etc.).

The exhaust aftertreatment system 14 includes an exhaust conduit 18 delivering the exhaust stream 16 and a Selective Catalytic Reduction (SCR) system 20. The SCR system 20 includes an SCR catalyst 22, and a reductant supply assembly 24.

In some aspects, the exhaust aftertreatment system 14 may also include a clean-up catalyst 30. While one aspect may not include a diesel oxidation catalyst or diesel particulate filter, another aspect of the aftertreatment system 14 may include those components. The SCR catalyst 22 and clean-up catalyst 30 may include the appropriate catalyst or other material, respective of their intended functions, disposed on a substrate. The substrate may include cordierite, silicon carbide, other ceramic, a metal structure, or the like. The substrates may form a honeycomb structure with a plurality of channels or cells for the exhaust stream 16 to pass through. The SCR catalyst 22 and clean-up catalyst 30 substrates may be housed in canisters, as shown, or may be integrated into the exhaust conduit 18. The SCR catalyst 22 and clean-up catalyst 30 may be in a canister, as shown, or may be separately disposed.

The exhaust aftertreatment system 14 is configured to remove, collect, or convert undesired constituents from the exhaust stream 16. The SCR catalyst 22 is configured to reduce an amount of nitrous oxides (NOx) or the like in the exhaust stream 16 in the presence of a reductant, e.g., diesel exhaust fluid (DEF).

The clean-up catalyst 30 may embody an ammonia oxidation catalyst (AMOX). The clean-up catalyst 30 may be configured to capture, store, oxidize, reduce, and/or convert the reductant that may slip past or breakthrough the SCR catalyst 22. The clean-up catalyst 30 may also be configured to capture, store, oxidize, reduce, and/or convert other constituents present in the exhaust stream.

In the illustrated aspect, the exhaust stream 16 exits the engine 12, passes through the SCR system 20, and then may pass through the clean-up catalyst 30, if utilized, via the exhaust conduit 18. In the illustrated aspect, the clean-up catalyst 30 is downstream of the SCR system 20. In other aspects, these devices may be arranged in a variety of orders and may be combined together in different combinations. Other exhaust treatment devices may also be located upstream, downstream, or within the SCR system 20.

The reductant supply assembly 24 may be configured to introduce the reductant into the exhaust upstream of the SCR catalyst 22. The reductant supply assembly 24 may include a reductant source 32, which may include a pump tank unit (PTU) 32, reductant lines 34, and an injector 36. In the aspect illustrated in FIGS. 1 and 2, the PTU 32 generally may include a reductant tank 40 and a pump 50. According to various alternative aspects, the pump 50 may be mounted to the reductant tank 40, such that the reductant tank 40 supplies vertical and horizontal support to the pump 50.

The reductant supply assembly 24 may also include a thermal management system 60 to thaw frozen reductant, prevent reductant from freezing, and/or prevent reductant from overheating in the reductant lines 34, the reductant tank 40 and the pump 50. One or more components of the reductant supply assembly 24 may also be insulated to prevent overheating and/or freezing of the reductant. According to one exemplary aspect, the thermal management system 60 includes an engine coolant supply line 61 and an engine coolant return line 62.

The injector 36 may inject reductant in a mixing section 70 of the exhaust conduit 18 where the reductant may be converted and mix with the exhaust stream 16. A mixer (not shown) may also be included in the mixing section 70 to assist the conversion and mixing. While other reductants are possible, urea is a common reductant. The urea reductant may convert, decompose, or hydrolyze into ammonia ($NH_3$) and may then be adsorbed or otherwise stored in the SCR catalyst 22. The $NH_3$ may then be consumed in the SCR catalyst 22 through a reduction of NOx into nitrogen gas ($N_2$).

The exhaust aftertreatment system 14 may also include a control system (not shown) with NOx sensors (not shown). The control system may use the NOx sensor or engine maps to control the introduction of reductant from the reductant supply assembly 24 to achieve the level of NOx reduction required while controlling ammonia slip.

Figure 2:
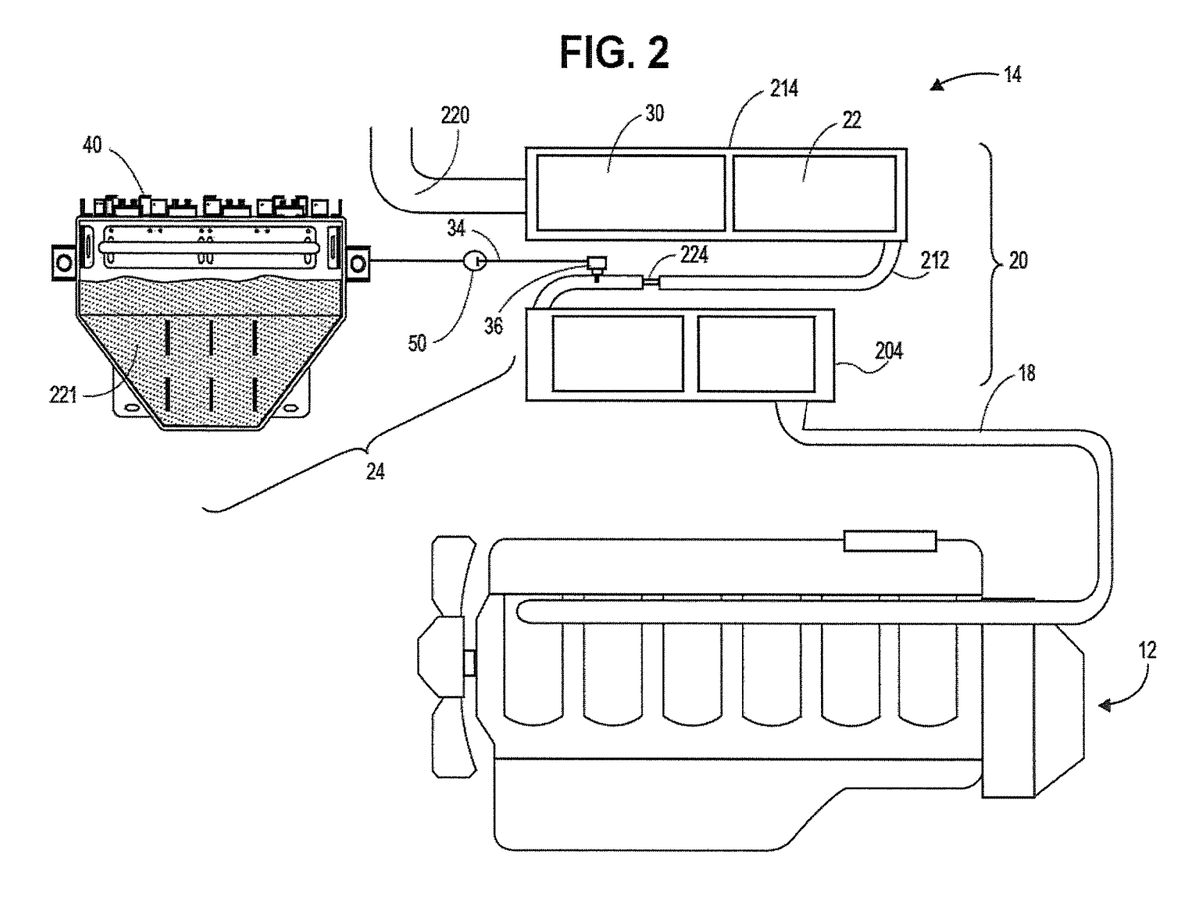
FIG. 2 is an exemplary view of an exhaust aftertreatment system according to an aspect of the disclosure.

FIG. 2 is an exemplary view of an exhaust aftertreatment system according to an aspect of the disclosure. In particular, FIG. 2 is a block diagram of an exhaust aftertreatment system 14 associated with the engine 12 of the machine 1. The aftertreatment system 14 may be modularly packaged as shown in the illustrated aspect for retrofit onto existing engines or, alternatively, for installation on new engines. In the illustrated aspect, the aftertreatment system 14 may include a first module 204 that is fluidly connected to an exhaust conduit 18 of the engine 12. During engine operation, the first module 204 may be arranged to receive engine exhaust gas from the conduit 18. Exhaust gas provided to the first module 204 by the engine 12 may first pass through the first module 204 before entering a transfer conduit 212. While one aspect does not include a diesel oxidation catalyst or diesel particulate filter, another aspect of the aftertreatment system 14 may include those components.

The transfer conduit 212 may fluidly interconnect the first module 204 with a second module 214 such that exhaust gas from the engine 12 may pass through the first and second modules 204 and 214 in series before being released at a stack 220 that is connected to the second module. In the illustrated aspect, the second module 214 encloses an SCR catalyst 22 and a clean-up catalyst 30. The SCR catalyst 22 and clean-up catalyst 30 operate to treat exhaust gas from the engine 12 in the presence of the reductant, which is injected into the exhaust gas in the transfer conduit 212.

More specifically, a reductant 221 such as a urea-containing water solution, which may be diesel exhaust fluid (DEF), may be injected into the transfer conduit 212 by an injector 36. The reductant 221 may be contained within a reductant tank 40 and may be provided to the injector 36 from the reductant lines 34 by a pump 50. The reductant 221 may be injected into the transfer conduit 212 where it may mix with exhaust gas passing through and may thus be provided to the second module 214.

To promote mixing of reductant 221 with exhaust, a mixer 224 may be disposed along the transfer conduit 212. To control the use of reductant 221, the exhaust aftertreatment system 14 may use electronic controls (not shown). The electronic controls may determine the amount of reductant 221 to use in accordance with parameters such as temperature, flow, speed, and the like. The electronic controls can include a processor configured to control the operation of the exhaust aftertreatment system 14.

Figure 3:
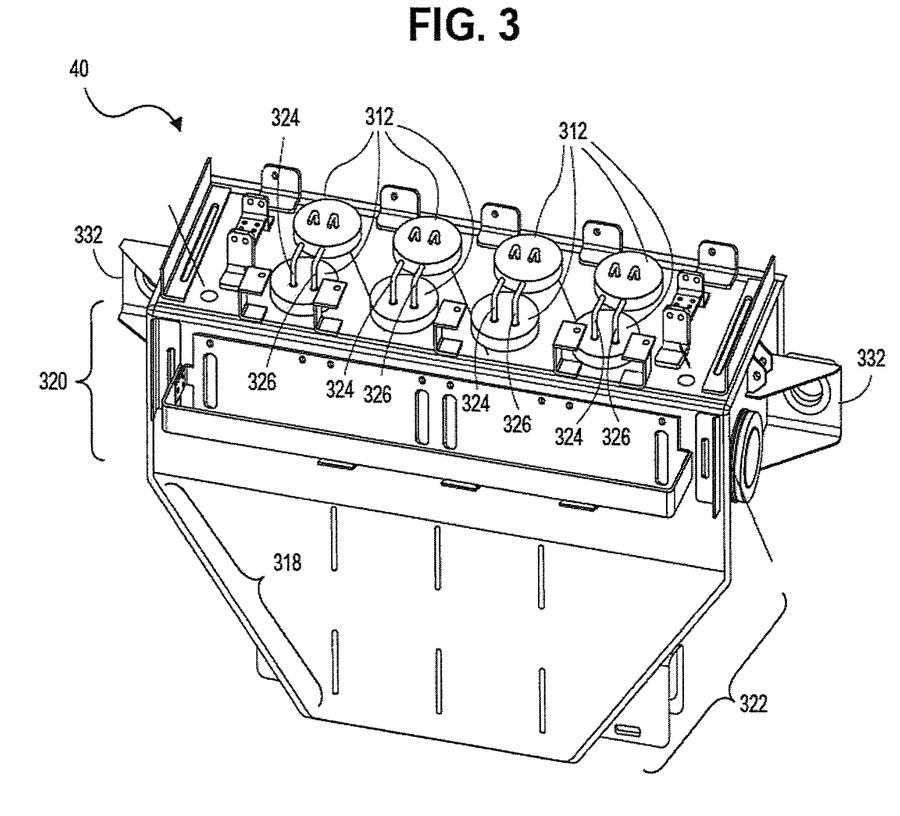
FIG. 3 is perspective front view of the insulated reductant tank according to an aspect of the disclosure.

FIG. 3 is perspective front view of the insulated reductant tank according to an aspect of the disclosure. In particular, FIG. 3 depicts an insulated reductant tank 40 that can be located on the machine 1. The reductant tank 40 may include mounting brackets 332 to attach the reductant tank 40 to the machine 1. The insulated reductant tank 40 houses reductant such as diesel exhaust fluid. Diesel exhaust fluid is typically a mixture of urea and water or the like. Other types of reductant are contemplated as well. The insulated reductant tank 40 includes a plurality of sides having an upper portion 320 and a lower portion 322. The lower portion 322 may be tapered in shape 318, and at least a portion (horizontal cross-section) of the lower portion may be narrower than the upper portion. The upper portion 320 provides an expansion volume for reductant when the reductant freezes and may allow expansion within the reductant tank 40. The reductant tank 40 may include headers 312 that have both a pickup line 324 and a fill line 326 and may have multiple pickup lines 324 and fill lines 326. The pickup line 324 may draw reductant from the reductant tank 40 to be transferred via the reductant lines 34 and injected with an injector 36 into a transfer conduit 212 of the aftertreatment system 14 as shown in FIG. 2. The fill line 326 may be where reductant is added to the reductant tank 40.

Figure 4:
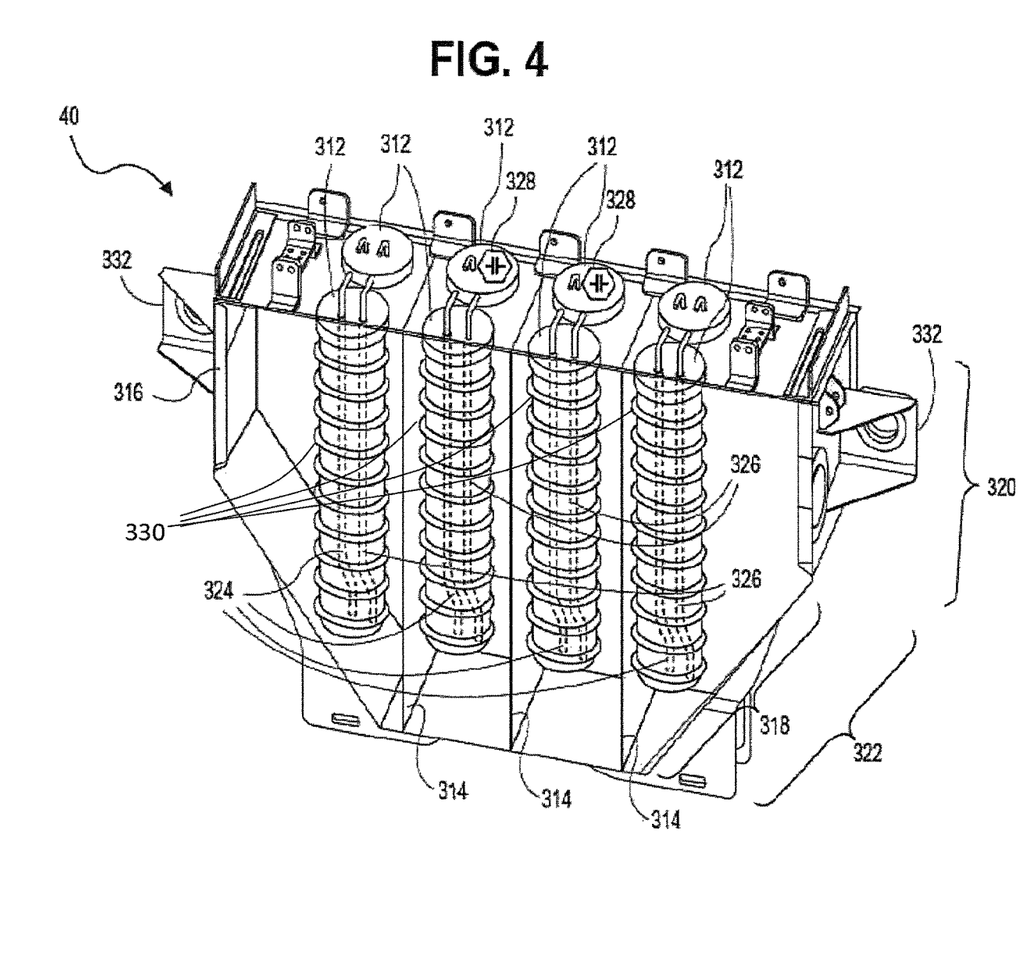
FIG. 4 is a perspective cutaway front view of the insulated reductant tank showing the internal components of the tank according to an aspect of the disclosure.

FIG. 4 is a perspective cutaway view of the insulated reductant tank showing the internal components of the tank according to an aspect of the disclosure. As depicted in FIG. 4, the reductant tank 40 also has an insulation layer 316 arranged at the upper portion 320 of the reductant tank 40 and which may line only the upper portion 320 in one aspect. The insulation layer 316 may be bound on both sides by a sheet metal layer or the like, and can either be on the inside or outside of the reductant tank 40. The insulation layer 316 may also include ceramic fiber, needled blanket material, or the like. The insulation layer 316 may be contained and may be fastened to either the inside or outside of the upper portion 320 of the reductant tank 40. The insulation layer 316 may line the upper portion 320 of the reductant tank 40 so as to create an insulated expansion volume for reductant when reductant freezes in the reductant tank 40. In one aspect, the insulated upper portion 320 of the reductant tank 40 includes the upper third of the reductant tank 40, but in other aspects might include a different proportion of the reductant tank 40 based on the size and characteristics of the reductant tank 40. In one aspect, the lower portion 322 of the reductant tank 40 will not have insulation. Additionally, the top surface of the reductant tank 40 may also contain an insulation layer 316.

In yet another aspect, the reductant tank 40 may contain an insulation layer 316 in the lower portion 322 of the tank. In this aspect, the insulation layer 316 of the lower portion 322 may be less insulating than the insulation layer 316 on the upper portion 320 so that reductant in the upper portion 320 may not freeze at least until after reductant freezes in the lower portion 322.

In still another aspect, the insulation layer 316 can line the inside and outside of the reductant tank 40 on both the upper portion 320 and lower portion 322. In such an aspect, the insulation layer may be more insulating on the upper portion 320 so that reductant in the upper portion 320 may not freeze at least until after reductant freezes in the lower portion 322.

In another aspect, the insulation layer 316 may be contained in between the inside surface of the reductant tank 40 and the outside surface of the reductant tank 40. In such an aspect, the insulation layer 316 may be contained as an additional layer, with the inside surface and the outside surface of the reductant tank 40 providing a space in between which the insulation layer 316 can be contained without touching reductant inside of the reductant tank 340. In such an aspect, the insulation layer 316 may be contained only in the upper portion 320 or in both the upper portion 320 and in the lower portion 322. If the insulation layer lines both the upper portion 320 and lower portion 322, the insulation layer 316 in the upper portion 320 may be more insulating than the insulation layer 316 in the lower portion 322 so that reductant in the upper portion 320 may not freeze at least until after reductant freezes in the lower portion 322.

The insulation layer 316 may line any portion of the plurality of walls making up the reductant tank 40 as long as the insulation layer 316 in the upper portion 320 may be more insulating than the insulation layer 316 in the lower portion 322 so that reductant in the upper portion 320 may not freeze at least until after reductant freezes in the lower portion 322. In one aspect, the insulation layer 316 will line at least one portion of the tank by wrapping entirely around the circumference of the reductant tank 40. In another aspect, the insulation layer 316 may line at least one portion of the reductant tank 40 without completely wrapping around the entire circumference of the reductant tank 40. In yet another aspect, the insulation layer may line the lower portion 322 without wrapping entirely around the circumference of the reductant tank 40 in the lower portion 322, while still wrapping entirely around the circumference of the upper portion 320 in a way that creates a more insulated upper portion 320 than lower portion 322.

In an aspect, the reductant tank 40 will have reductant in the upper portion 320 of the reductant tank 40 as well as in the lower portion 322. When the reductant tank 40 is subjected to below-freezing temperatures, the reductant may freeze from the outside of the reductant tank 40 inwards, trapping unfrozen reductant fluid in the center of the reductant tank 40. The reductant will freeze first in the lower portion 322 of the reductant tank 40 because the lower portion 322 is uninsulated while the upper portion 320 is insulated with the insulation layer 316.

The lower portion 322 of the reductant tank 40 may have a tapered shape 318 so as to facilitate the upward movement of reductant into the insulated 316 upper portion 320 of the reductant tank 40 as reductant freezes in the lower portion 322 of the reductant tank 40. The tapered shape 318 also may allow for the reductant to be drawn from the bottom of the reductant tank 40 by the pickup line 324 even when the reductant tank 40 is oriented unevenly, such as when the machine 1 is operating on an incline. The tapered shape 318 of the lower portion 322 of the reductant tank 40 may be manufactured by molding, stamping or the like to provide the chamfered shape, which may be two-dimensional (as shown) or may be three-dimensional (chamfered in one additional dimension). The tapered shape 318 of the lower portion 322 of the reductant tank 40 forces frozen reductant to push surrounding unfrozen reductant upward into the upper portion 320 of the reductant tank 40 with the insulation layer 316. This occurs because the frozen reductant may generally expand in volume. Rather than expanding outwardly and straining the reductant tank 40, the fluid pushed by the frozen fluid is directed upward due to the tapered shape 318 of the lower portion 322 of the reductant tank 40. Therefore, the fluid moves into the upper portion 320 where an expansion volume will be provided by the upper portion 320.

The reductant tank 40 may also include components such as headers 312 that draw reductant from the reductant tank 40 and may supply the reductant to an exhaust aftertreatment system 14. The headers 312 can include a heating coil 330 to the reductant. The heating coil 330 may receive hot coolant fluid from the engine 12 or may be electrical heaters. The headers 312 may also include temperature and fluid sensors 328 to monitor reductant characteristics such as fluid temperature, fluid level, and the like. The headers 312 may also include an electronic control (not shown) configured to control use of the reductant. The reductant tank 40 may further include baffles 314 that may control the flow of reductant from different areas of the reductant tank 40. The baffles 314 may also control local freezing of reductant and ensure that the reductant may stay within portions of the reductant tank 40 where the reductant may be pumped. The baffles 314 may include apertures (not shown) to allow a limited movement of reductant from one area of the reductant tank 40 to another area of the reductant tank 40.

Figure 5:
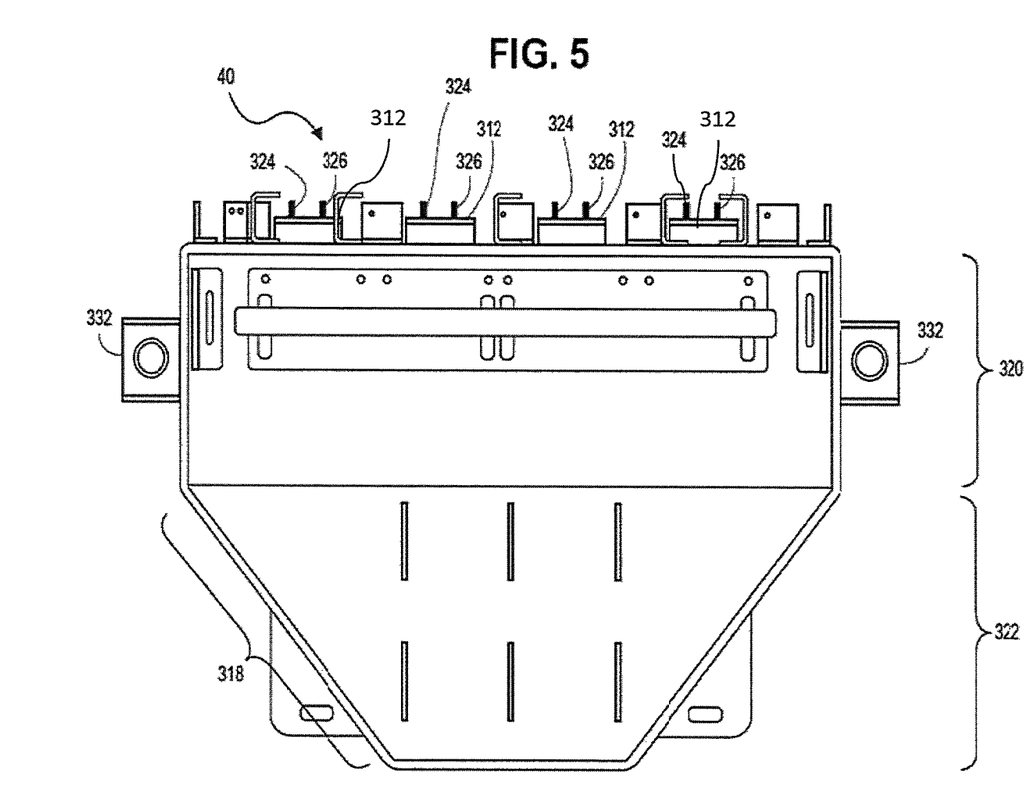
FIG. 5 is a rear view of the insulated reductant tank of FIG. 4.

FIG. 5 is a rear view of the insulated reductant tank of FIG. 4. In particular, FIG. 5 shows a rear view of the reductant tank 40. The rear view of the reductant tank 40 depicts the tapered shape 318 of the lower portion 322 of the reductant tank 40. The rear view of FIG. 5 shows one of the plurality of lower sides that includes the tapered shape 318 of the lower portion 322 of the reductant tank 40.

Figure 6:
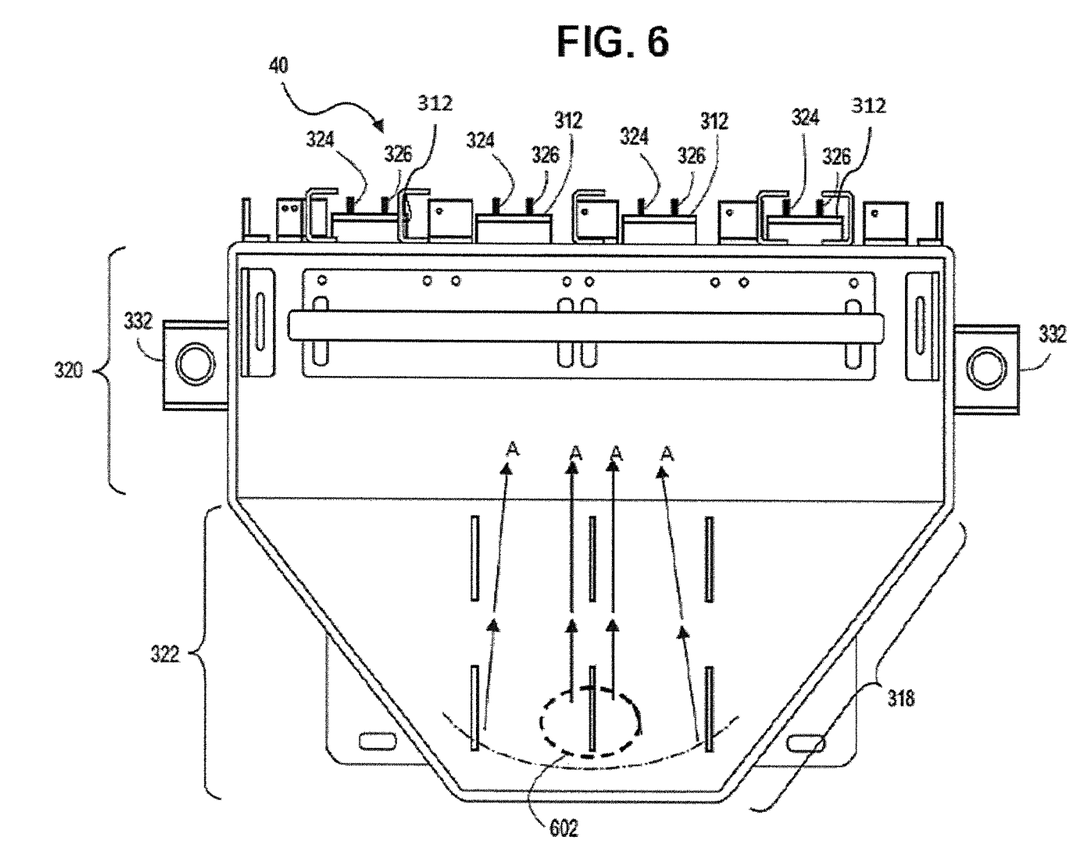
FIG. 6 shows how the reductant freezes initially in the lower portion of the reductant tank according to an aspect of the disclosure.

FIG. 6 shows a cross-section of the reductant tank illustrating how the reductant freezes initially in the lower portion of the reductant tank according to an aspect of the disclosure. In particular, FIG. 6 generally shows a progression of how the frozen reductant 602 may freeze in the reductant tank 40 and may force the unfrozen reductant into an expansion volume in the upper portion 320 of the reductant tank 40 as shown by Arrow A. The reductant may expand as it freezes and may fill any volume occupied by a less dense medium. When additional volume is not available, the reductant may apply a force against the reductant tank 40. The tapered shape 318 of the lower portion 322 of the reductant tank 40 may facilitate an upward movement of the reductant into the upper portion 320 of the reductant tank 40 into an expanded volume where the insulation layer 316 is arranged (shown in FIG. 4). This way the reductant may expand into the upper portion 320 and will less likely expand outward against the reductant tank 40, thus strategically facilitating a way to reduce damage to the reductant tank 40.

INDUSTRIAL APPLICABILITY

The disclosure is applicable to reductant tanks in general and specifically to insulating a reductant tank to strategically control the freezing of reductant so as to minimize the damage that frozen reductant can cause to a reductant tank as frozen reductant expands. Referring to FIGS. 1 and 2, an exhaust aftertreatment system 14 may treat diesel exhaust to meet environmental regulations. To abate certain diesel engine exhaust constituents, the exhaust aftertreatment system 14 converts pollutants to more desirable constituents such as converting nitrogen oxides in the exhaust to water with a selective catalytic reduction system 20. For example, the reductant can be used by the selective catalytic reduction system 20 to lower nitrogen oxide concentration in diesel exhaust emissions. Such reductant can be introduced into the exhaust aftertreatment system 14 via an injector 36 into the transfer conduit 212. The reductant lines 34 is fluidly connected to the reductant tank 40 to transfer reductant from the reductant tank 40 to the transfer conduit 212.

Reductant may be stored on the machine 1 in a reductant tank 40. To control the use of reductant, the exhaust aftertreatment system 14 may use electronic controls (not shown). The electronic controls may determine the amount of reductant to use in accordance with parameters such as ambient temperature, fuel flow, exhaust flow, vehicle velocity, engine speed, engine operating temperature, and the like. The electronic controls can include a processor configured to control the operation of the exhaust aftertreatment system 14.

In cold temperatures, reductant may freeze inside of the reductant tank 40. Such freezing occurs when the outside of the reductant tank 40 is subject to freezing temperatures while not being heated. When this occurs, the frozen fluid inside of the reductant tank 40 expands. The disclosure strategically allows for the reductant to freeze and expand as in FIG. 6 so as to prevent the reductant tank 40 from being damaged.

In this regard, the reductant tank 40 may include strategic positioning of the insulation layer 316 in an upper region of the reductant tank 40 as shown in FIG. 4. The insulation layer 316 may line the inside or outside of the reductant tank 40, but for aesthetic and functional reasons it may line the inside of the reductant tank 40. The insulation layer 316 may also be arranged on the top of the reductant tank 40. The inclusion and placement of the insulation layer 316 lining the upper portion 320 ensures that when reductant in the lower portion 322 freezes, it will expand upwardly. Accordingly, damage to the reductant tank 40 may be reduced or prevented.

Referring to FIG. 6, when the reductant in the reductant tank 40 begins to freeze, the frozen reductant 602 may expand and force reductant into the insulated upper portion 320 of the reductant tank 40, in part due to the tapered shape 318 of the lower portion 322. Without the additional volume provided by the upper portion 320, the frozen and expanding reductant would apply a force against the reductant tank 40. The upper portion 320 of the reductant tank 40 may provide an additional volume for reductant after freezing in order to prevent or reduce this force being applied to the reductant tank 40. In addition, the insulation layer 316 may ensure that the liquid reductant at the insulated upper portion 320 of the reductant tank 40 freezes last so as to guide expansion upwardly and prevent/reduce damage of the reductant tank 40.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An insulated reductant tank comprising:
a plurality of sides connected to form a tank having an upper portion and a lower portion, the upper portion having a non-tapered shape and the lower portion having a tapered shape; and
a component configured to draw reductant from the tank and supply the reductant to an exhaust aftertreatment system;
wherein the upper portion and the lower portion are configured with at least one insulation layer to control freezing of the reductant within the tank, and wherein the at least one insulation layer insulates the upper portion more than the lower portion.

2. The insulated reductant tank of claim 1, wherein the at least one insulation layer is bound on both sides by a sheet metal layer.

3. The insulated reductant tank of claim 1, further comprising at least one baffle configured to control a flow of the reductant and configured to control local freezing of the reductant in the tank.

4. The insulated reductant tank of claim 1, wherein at least a portion of the lower portion is narrower than the upper portion.

5. The insulated reductant tank of claim 4, wherein the at least one insulation layer lines at least one inside surface of the tank.

6. The insulated reductant tank of claim 4, wherein the at least one insulation layer lines at least one exterior surface of the tank.

7. The insulated reductant tank of claim 1, wherein the tank is chamfered along two sides and configured to facilitate a flow path of the reductant from the lower portion to the upper portion when the reductant freezes in the tank.

8. An insulated reductant system comprising:
a machine configured to operate on diesel fuel;
a diesel fuel engine on the machine;
an exhaust aftertreatment system on the machine;
an insulated reductant tank on the machine comprising a plurality of sides connected to form a tank having an upper portion and a lower portion, the upper portion having a non-tapered shape and the lower portion having a tapered shape; and
a component configured to draw reductant from the tank and supply the reductant to the exhaust aftertreatment system;
wherein the upper portion and the lower portion are configured with at least one insulation layer to control freezing of the reductant within the tank, and wherein the at least one insulation layer insulates the upper portion more than the lower portion.

9. The insulated reductant system of claim 8, wherein the reductant tank further comprises at least one baffle configured to control a flow of the reductant and configured to control local freezing of the reductant in the reductant tank.

10. The insulated reductant system of claim 8, wherein at least a portion of the lower portion is narrower than the upper portion.

11. The insulated reductant system of claim 10, wherein the at least one insulation layer lines at least one inside surface of the reductant tank.

12. The insulated reductant system of claim 10, wherein the at least one insulation layer lines at least one exterior surface of the reductant tank.

13. The insulated reductant system of claim 8, wherein the reductant tank contains a plurality of heating coils each extending through both the upper portion and the lower portion.

14. The insulated reductant system of claim 8, wherein the reductant tank is chamfered along two sides and configured to facilitate a flow path of the reductant from the lower portion to the upper portion when the reductant freezes in the reductant tank.

15. A method for controlling freezing of a diesel exhaust fluid reductant in a reductant tank, comprising:
arranging a plurality of sides having an upper portion and a lower portion to provide the reductant tank, wherein the lower portion of the plurality of sides is tapered and the upper portion of the plurality of sides is non-tapered;
insulating the upper portion and the lower portion of the plurality of sides of the reductant tank with at least one insulation layer, wherein insulating the upper portion and the lower portion comprises insulating the upper portion more than the lower portion; and
providing an expansion volume in the reductant tank in the upper portion.

16. The method of claim 15, further comprising facilitating a flow path for a reductant from the lower portion to the upper portion when the reductant freezes in the reductant tank.

17. The method of claim 15, wherein insulating the upper portion of the reductant tank comprises insulating at least one of the following: an inside surface of the reductant tank or insulating an exterior surface of the reductant tank.

\* \* \* \* \*